US008441982B2

United States Patent
Li et al.

(10) Patent No.: US 8,441,982 B2
(45) Date of Patent: May 14, 2013

(54) MULTIPLE ANTENNA MODE CONTROL METHOD BASED ON STATION

(75) Inventors: Feng Li, Shenzhen (CN); Li Zhang, Shenzhen (CN); Bin Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 900 days.

(21) Appl. No.: 12/442,945

(22) PCT Filed: Sep. 18, 2007

(86) PCT No.: PCT/CN2007/002757
§ 371 (c)(1),
(2), (4) Date: Mar. 25, 2009

(87) PCT Pub. No.: WO2008/037180
PCT Pub. Date: Apr. 3, 2008

(65) Prior Publication Data
US 2010/0189030 A1    Jul. 29, 2010

(30) Foreign Application Priority Data
Sep. 28, 2006   (CN) .......................... 2006 1 0113452

(51) Int. Cl.
*H04W 4/00* (2009.01)
(52) U.S. Cl.
USPC .......................................... 370/328; 455/450
(58) Field of Classification Search ........................ None
See application file for complete search history.

(56) References Cited

U.S. PATENT DOCUMENTS

| | | | | |
|---|---|---|---|---|
| 7,933,629 B2 * | 4/2011 | Kwon et al. | ............... | 455/562.1 |
| 2003/0125040 A1 * | 7/2003 | Walton et al. | .................. | 455/454 |
| 2005/0265281 A1 * | 12/2005 | Ketchum | ...................... | 370/328 |
| 2008/0192683 A1 * | 8/2008 | Han et al. | ...................... | 370/329 |
| 2008/0280619 A1 * | 11/2008 | Chun et al. | .................... | 455/446 |
| 2009/0044065 A1 * | 2/2009 | She et al. | ...................... | 714/748 |

FOREIGN PATENT DOCUMENTS

| | | |
|---|---|---|
| CN | 1773885 A | 5/2006 |
| CN | 1780173 A | 5/2006 |
| WO | 2006098538 A1 | 9/2006 |

OTHER PUBLICATIONS

P.R. China, State Intellectual Property Office, International Search Report for International Application No. PCT/CN2007/002757, mailed Dec. 6, 2007.

* cited by examiner

*Primary Examiner* — Bunjob Jaroenchonwanit
(74) *Attorney, Agent, or Firm* — Bright IP Law Offices

(57) ABSTRACT

The present invention provides a multiple antenna mode control method based on Station, including the steps: step 1 the Station reports a multiple antenna mode set or subset supported by the Station to the Access Point; step 2, the Access Point returns a multiple antenna mode set or subset supported by the Access Point to the Station, or returns directly a multiple antenna mode set or subset supported by both the Station and the Access Point to the Station; and step 3, a multiple antenna mode is chosen from a multiple antenna mode set or subset supported by both the Station and the Access Point for communicating between the Station and the Access Point. Thereby, a best transmission quality can be achieved during data transmission, and furthermore, the retransmission times and the error frame rate are reduced, and the network throughput is decreased.

13 Claims, 4 Drawing Sheets

MULTIPLE ANTENNA MODE CONTROL METHOD BASED ON STATION

TECHNICAL FIELD

The present invention relates to multiple antenna control technique in wireless communication field, more particularly to a multiple antenna mode control method based on Station.

BACKGROUND OF THE INVENTION

In wireless communication system, multiple antenna techniques are commonly used. According to their basic principles, these techniques can be classified into three categories: spatial multiplexing, spatial diversity and beam forming.

The core idea of the spatial multiplexing technique lies in that a sending end and a receiving end respectively use a plurality of antennas arranged in proper positions or with different polarities to form a plurality of channels independent with each other between the sending end and the receiving end. As a result, the sending end can send different data to different channels and the receiving end can receive these data respectively to acquire greater spectral efficiency.

The core idea of the spatial diversity technique lies in that a transmitter and a receiver use a plurality of antennas arranged in proper positions or with different polarities to produce an independent fading channel. The sending end encodes a same signal and sends it to different channels to achieve the spatial diversity. Due to the employment of the coding technique, the spatial diversity technique can obtain some coding gain in addition to diversity gain.

The core idea of the beam forming technique lies in that a transmitter and a receiver use a plurality of antennas arranged in proper positions to enable the sending end and the receiving end to get channels with the same or similar fading characteristics. The difference among the different channels lies in different routes, according to which the receiving end can get the Direction of Arrivals (DOA) of a signal conveniently and processing gain can be obtained by adjusting the phase of the receiving antenna and making the array antennas point at the coming direction of the signal.

The spatial multiplexing technique is usually applicable to the condition of a good-quality channel; the spatial diversity technique is applicable to a complex environment of multi-path fading; and the beam forming technique is applicable to an open and outdoor channel environment with a main path. However, due to the different basic principles employed respectively, it is difficult to use these three techniques in a multiple antenna system at the same time. Therefore, only one of the above three multiple antenna systems is usually applied in wireless communication system.

With people's increasing demand on wireless mobile services, it becomes a goal pursued by wireless communication system to acquire the greatest performance by different techniques in different scenarios. Therefore, a multiple antenna mode control method is in urgent need to enable wireless communication system to cover a mobile Station and an Access Point with the spatial multiplexing, the spatial diversity and the beam forming techniques at the same time, and to allow the sending and the receiving ends to select a suitable multiple antenna mode for transmitting data according to the specific channel environment.

SUMMARY OF THE INVENTION

To address the above problems, the present invention provides a multiple antenna mode control method based on Station, used to construct a communication mode supported by different communication systems in a specified multiple antenna mode. Therefore, both the sending and receiving ends can make a self-adaptive selection of a suitable multiple antenna mode for data transmission.

The multiple antenna mode control method based on Station provided in the present invention comprises the following steps: step 1, the Station reports a multiple antenna mode set or subset supported by the Station to the Access Point; step 2, the Access Point returns a multiple antenna mode set or subset supported by the Access Point to the Station, or returns directly a multiple antenna mode set or subset supported by both the Station and the Access Point to the Station; and step 3, a multiple antenna mode is chosen from a multiple antenna mode set or subset supported by both the Station and the Access Point for communicating between the Station and the Access Point.

Step 1 comprises that the Station transmits a frame carrying information about the multiple antenna mode set or subset supported by the Station to the Access Point in a manner that the Access Point can analyze.

The multiple antenna mode set includes multiple antenna mode set comprising all transmitting antenna modes and receiving antenna modes supported by the Station and the Access Point agreed in advance according to communication protocol, wherein, each multiple antenna mode is determined according to the number of antennas of both sending and receiving ends as well as a corresponding algorithm.

The multiple antenna mode set supported by the Station refers to all transmitting antenna modes and receiving antenna modes supported by the Station; and the multiple antenna mode subset supported by the Station refers to part of the transmitting antenna modes and receiving antenna modes supported by the Station. A transmitting antenna mode is not equal to a receiving antenna mode of a same Station.

Step 2 comprises that after receiving the multiple antenna mode set reported by the Station, the Access Point sends a frame to the Station in a manner the Station can analyze; wherein, the frame carries the multiple antenna mode set or subset supported by the Access Point, or the multiple antenna mode set or subset supported by both the Station and the Access Point returned directly by the Access Point.

In step 2, the step of the Access Point returns to the Station the multiple antenna mode set or subset supported by the Access Point comprises: after receiving the multiple antenna mode set or subset supported by the Station, the Access Point acquires a valid multiple antenna mode set supported by both the Access Point and the Station during their communication; and the Access Point returns the multiple antenna mode set or subset supported by the Access Point to the Station.

In step 2, the step of the Access Point returns directly to the Station the multiple antenna mode set or subset supported by both the Station and the Access Point comprises: after receiving the multiple antenna mode set or subset supported by the Station, the Access Point acquires a valid multiple antenna mode set or subset supported by both the Access Point and the Station during their communication; and the Access Point returns to the Station the valid multiple antenna mode set or subset supported by both the Station and the Access Point.

Wherein, the multiple antenna mode set supported by the Access Point refers to all transmitting antenna modes and receiving antenna modes supported by the Access Point, whereas the multiple antenna mode subset supported by the Access Point refers to part of the transmitting antenna modes and receiving antenna modes supported by the Access Point. A transmitting antenna mode is not equal to a receiving antenna mode of a same Access Point.

Step 3 further comprises that with either the Station or the Access Point taken as a sending end, a multiple antenna mode is chosen from the multiple antenna mode set or subset supported by both the Station and the Access Point for broadcasting, multicasting or unicasting.

In step 3, the step of choosing a multiple antenna mode from the multiple antenna mode set or subset supported by both the Station and the Access Point comprises: the sending end selects a multiple antenna mode from the multiple antenna mode set or subset supported by the Station and the Access Point, and sends the mode information to the receiving end in a manner that the receiving end can analyze; the sending end sends the data to be sent in the multiple antenna mode, and the receiving end receives and analyzes the mode information to receive the data in a corresponding multiple antenna mode.

In step 3, the step of choosing a multiple antenna mode from the multiple antenna mode set or subset supported by both the Station and the Access Point comprises that: the sending end and the receiving end agrees in advance a multiple antenna mode of data to be sent, the sending end sends the data to be sent in the multiple antenna mode, while the receiving end receives the data in a corresponding multiple antenna mode; wherein, the multiple antenna mode is one of the multiple antenna mode set or subset supported by both the Station and the Access Point.

Therefore, the present invention covers the mobile Station and the Access Point employing three techniques of the spatial multiplexing, the spatial diversity and the beam forming at the same time. The invention also allows both the sending and receiving ends to select a suitable multiple antenna mode for data transmission according to particular channel environments. It may help overcome disadvantages in the prior art of communication systems in which only one multiple antenna transmission mode is configured. Thereby, the best transmission quality can be achieved during the data transmission, furthermore, the retransmission times and the error frame rate are reduced, and the network throughput is decreased.

Additional features and advantages of the invention will be set forth in the description given below and will partly become apparent upon examination of the following description or may be understood from implementation of the invention. The objectives and other advantages of the invention may be realized and attained by the structure particularly pointed out in the written description and claims hereof as well as the appended drawings.

BRIEF DESCRIPTIONS OF THE DRAWINGS

The appended drawings intend to help further understanding of the invention, and constitute part of the description. They are used to explain the invention together with the embodiments, and shall not be construed as limitations on the invention. In the appended drawings.

DETAILED DESCRIPTION OF THE PREFERRED EMBODIMENTS

With reference to the drawings above, a description of the preferred embodiments is to be given below. It is to be understood that the preferred embodiments herein intend only to describe and explain the invention, not to limit the invention.

Figure 1:
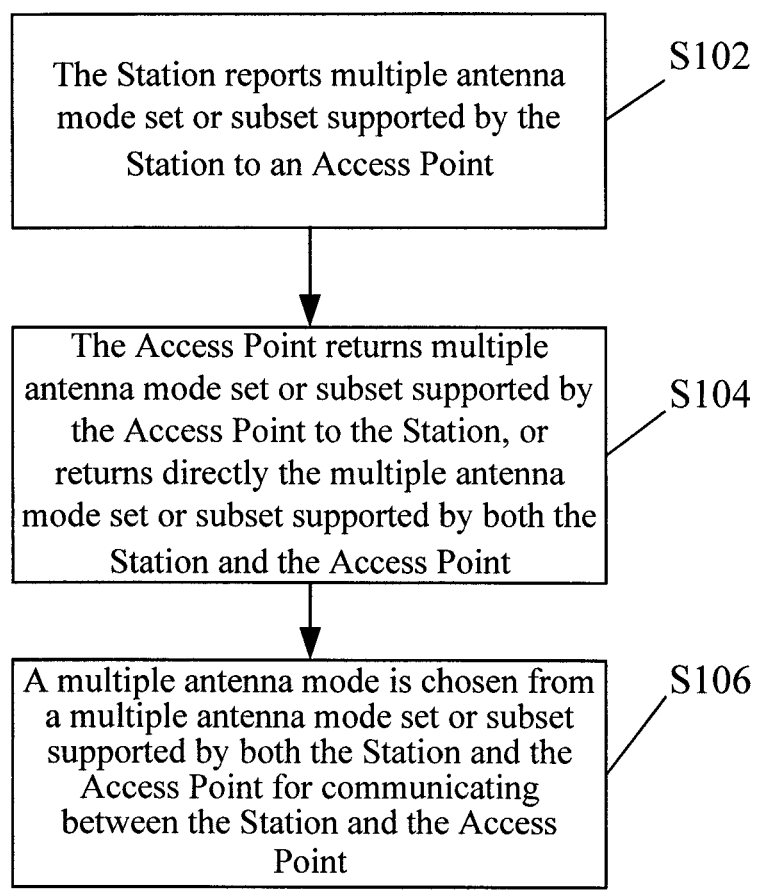
FIG. 1 is a flow chart of the multiple antenna control method in Wireless Local Area Network (WLAN) of the invention's embodiment.

FIG. 1 is a flow chart of the multiple antenna control method in WLAN of the invention's embodiment. As illustrated in FIG. 1, a Station (STA) reports a multiple antenna mode set or subset supported by the Station to an Access Point (AP); the Access Point returns a multiple antenna mode set or subset supported by the Access Point to the Station, or returns a multiple antenna mode set or subset supported by both the Station and the Access Point to the Station; a multiple antenna mode is chosen from the multiple antenna mode set supported by both the Station and the Access Point for communicating.

As shown in FIG. 1, the method for data transmission in WLAN of the embodiment includes the following steps:

S102, the Station reports multiple antenna mode set or subset supported by the Station to the Access Point;

More exactly, the Station configures multiple antenna mode information according to the multiple antenna mode set or subset supported by the Station, and reads the configuration result into an antenna mode subfield of capability information field in an association request frame. The Station reports to the Access Point the multiple antenna mode set or subset supported by the Station through sending the association request frame in a manner the Access Point can receive.

The multiple antenna mode set comprises multiple antenna mode set comprising of all transmitting antenna modes and receiving antenna modes likely to be supported by all Stations and the Access Point, agreed in advance according to a communication protocol, wherein each multiple antenna mode is determined by antenna numbers of both sending side and receiving side as well as a corresponding algorithm, and the number of the multiple antenna mode set is countable NA.

The multiple antenna mode set or subset supported by the Station comprises: all the multiple antenna mode sets supported by the Station and regulated by the protocol, and also the subsets of the multiple antenna mode sets.

The multiple antenna mode set supported by the Station refers to all transmitting antenna modes and receiving antenna modes supported by the Station.

The multiple antenna mode subset supported by the Station refers to part of the transmitting antenna modes and the receiving antenna modes supported by the Station.

Information of the multiple antenna mode set or subset supported by the Station refers to information that determines the multiple antenna mode set or subset supported by the Station.

For example, the number of all antennas of the Station and their corresponding sending and receiving algorithm codenames constitute the information of the multiple antenna mode set supported by the Station; when the Station supports n (n<NA) modes, all information of the n modes is called the information of the multiple antenna mode set supported by the Station. According to application scenarios or particular configurations, the Station reports only m (m<n) modes supported by the Station, and information of the m modes is called the information of the multiple antenna mode subset supported by the Station.

The antenna modes sent and received by the same Station could be not peer-to-peer. For example, the Station supports a space-time code sending of 2 antennas during sending, but a selective combining receiving of 2 antennas during receiving.

The step includes that the Station sends a frame to the Access Point in a manner the Access Point can analyze. Wherein, the frame carries the multiple antenna mode set or subset supported by the Station.

S104, the Access Point returns multiple antenna mode set or subset supported by the Access Point to the Station, or directly returns multiple antenna mode set or subset supported by both the Station and the Access Point to the Station;

More exactly, the Access Point receives the association request frame of the Station, and acquires the multiple antenna mode set or subset supported by the Station through analyzing an antenna mode subfield in the association request frame. The Access Point configures information of multiple antenna mode according to the multiple antenna mode set or subset supported by the Access Point, and reads the configuration result into the antenna mode subfield of a capacity information field of the association response frame. The Access Point reports to the Station the multiple antenna mode set or subset supported by the Access Point through sending the association response frame.

The multiple antenna mode set or subset supported by the Access Point comprises: all the multiple antenna mode sets supported by the Access Point regulated by the protocol, as well as subsets of the multiple antenna mode sets.

The multiple antenna mode set supported by the Access Point refers to all transmitting antenna modes and receiving antenna modes supported by the Access Point.

The multiple antenna mode subset supported by the Access Point refers to part of the transmitting antenna modes and the receiving antenna modes supported by the Access Point.

Information of the multiple antenna mode set or subset supported by the Access Point refers to information that determines the multiple antenna mode set or subset supported by the Access Point.

For example, the number of all antennas of the Access Point and their corresponding sending and receiving algorithm code-names constitute the information of the multiple antenna mode set supported by the Station; when the Access Point supports N (N<NA) modes, all information of the n modes is called the information of the multiple antenna mode set supported by the Access Point. According to application scenarios or particular configurations, the Access Point reports only M (M<N) modes supported by the Access Point, and the information of the m modes is called the information of the multiple antenna mode subset supported by the Access Point.

The antenna modes sent and received by the same Access Point could be not peer-to-peer. For example, the Access Point supports a selective combing sending of 2 antennas during sending, while a space-time decode receiving of 2 antennas during receiving.

The step includes that after receiving the multiple antenna mode set or subset reported by the Station, the Access Point sends a frame to the station in a manner the Station can analyze; and the frame carries the multiple antenna mode set or subset supported by the Access Point, or the Access Point returns directly the multiple antenna mode set or subset supported by both the Station and the Access Point.

The step that the Access Point returns the multiple antenna mode set or subset supported by the Access Point further includes that: after receiving the multiple antenna mode set or subset supported by the Station, the Access Point acquires the valid multiple antenna mode set or subset supported by both the Access Point and the Station during communication between the Access Point and the Station, and returns the multiple antenna mode set or subset supported by the Access Point to the Station.

The step that the Access Point returns directly the multiple antenna mode set or subset supported by both the Station and the Access Point further includes that: after receiving the multiple antenna mode set or subset supported by the Station, the Access Point acquires the valid multiple antenna mode set or subset supported by both the Access Point and the Station during communication between the Access Point and the Station, and returns to the Station the valid multiple antenna mode set or subset supported by both the Station and the Access Point.

There are two alternative ways for the Access Point to configure the multiple antenna mode information according to the multiple antenna mode set or subset supported by the Access Point. One is to configure the multiple antenna mode information according to the multiple antenna mode set or subset supported by the Access Point; and the other is to configure the multiple antenna mode information according to the multiple antenna mode set or subset supported by both the Station and the Access Point.

S106, a multiple antenna mode is chosen for communication from the multiple antenna mode set or subset supported by both the Station and the Access Point.

The step further includes that either the Station or the Access Point is taken as a sending end, and the multiple antenna mode is chosen from the multiple antenna mode set or subset supported by both the Station and the Access Point for broadcasting, multicasting or unicasting.

The step of choosing a multiple antenna mode from the multiple antenna mode set or subset supported by both the Station and the Access Point could be that: the sending end selects a multiple antenna mode from the multiple antenna mode set or subset supported by both the Station and the Access Point, and sends its mode information in a manner that the receiving end can analyze, to be followed immediately by data to be sent in the multiple antenna mode. The receiving end analyzes the mode information first, and then receives the data from the sending end in a corresponding mode.

The step of choosing a multiple antenna mode from the multiple antenna mode set or subset supported by both the Station and the Access Point could also be that: the sending and receiving ends agree in advance on a multiple antenna mode of the data to be sent, the multiple antenna mode hereof is one of the multiple antenna set or subset supported by both the Station and the Access Point. And then, the sending end sends the data to be sent in the mode hereof, while the receiving end receives the data in a corresponding mode.

More specifically, two alternative methods as follows are employed to realize the step.

The first method: when there is data to be transmitted, the sending end (either the Station or the Access Point) selects a multiple antenna mode, with consideration of either or both of the two elements, the current channel quality condition and the demand for Quality of Service (QoS) of the data to be sent. During the sending process, the sending end reads the multiple antenna mode into a field related to antenna information in a physical frame header. The format of the physical frame for sending data consists of two parts: the first part is a physical frame header, sent in a basic rate, i.e. the most reliable transmission rate, and analyzable regardless of whether the receiving end supports the multiple antenna mode or not; and the second part is the data sent in the multiple antenna mode. The receiving end is able to receive and analyze the physical frame header and acquire the multiple antenna mode for subsequent data sending from the field related to the antenna information in the physical frame header. The receiving end receives the sent data in a corresponding multiple antenna mode thereafter.

The field related to the antenna information could simply be the multiple antenna mode information, or mapping information of the multiple antenna mode and modulating mode and coding mode.

The second method: first, a connection is established between the Station and the Access Point, in a way that either the Station or the Access Point sends first a connection request, wherein a multiple antenna mode supported by both the sending and the receiving ends is assigned, and the other end gives a response acknowledgement. After the connection is established, either the Station or the Access Point can send data to be transmitted matching the connection in a corresponding multiple antenna mode, while the other end can receive the data in a corresponding multiple antenna mode. Multiple connections can be established between the Station and the Access Point, and the multiple antenna modes of the connections could be the same or not.

When selecting a multiple antenna mode, the sending end may consider either or both of the two elements of the current channel quality condition and the demand on QoS of the data to be sent, wherein the element of current channel quality condition may be considered in view of previous experience or the statistics and measurement of recent or current transmission condition. At the first sending a selected multiple antenna mode to a specific receiving end, the selected multiple antenna mode can be chosen from the multiple antenna mode set or subset supported by both the Station and the Access Point, transmitted in the maximum rate, the most reliable rate, or a middle rate of the two rates.

Thereby, the multiple antenna control method in WLAN of the present embodiment can employ different multiple antenna modes according to the channel condition and the demand of data on QoS, to adapt to changes of channel quality caused by mobility or other factors.

The method is applicable to conditions of direct communications between an Access Point and another Access Point or between a Station and another Station.

The step includes solving a problem that either end does not support the multiple antenna mode.

Figure 2A:
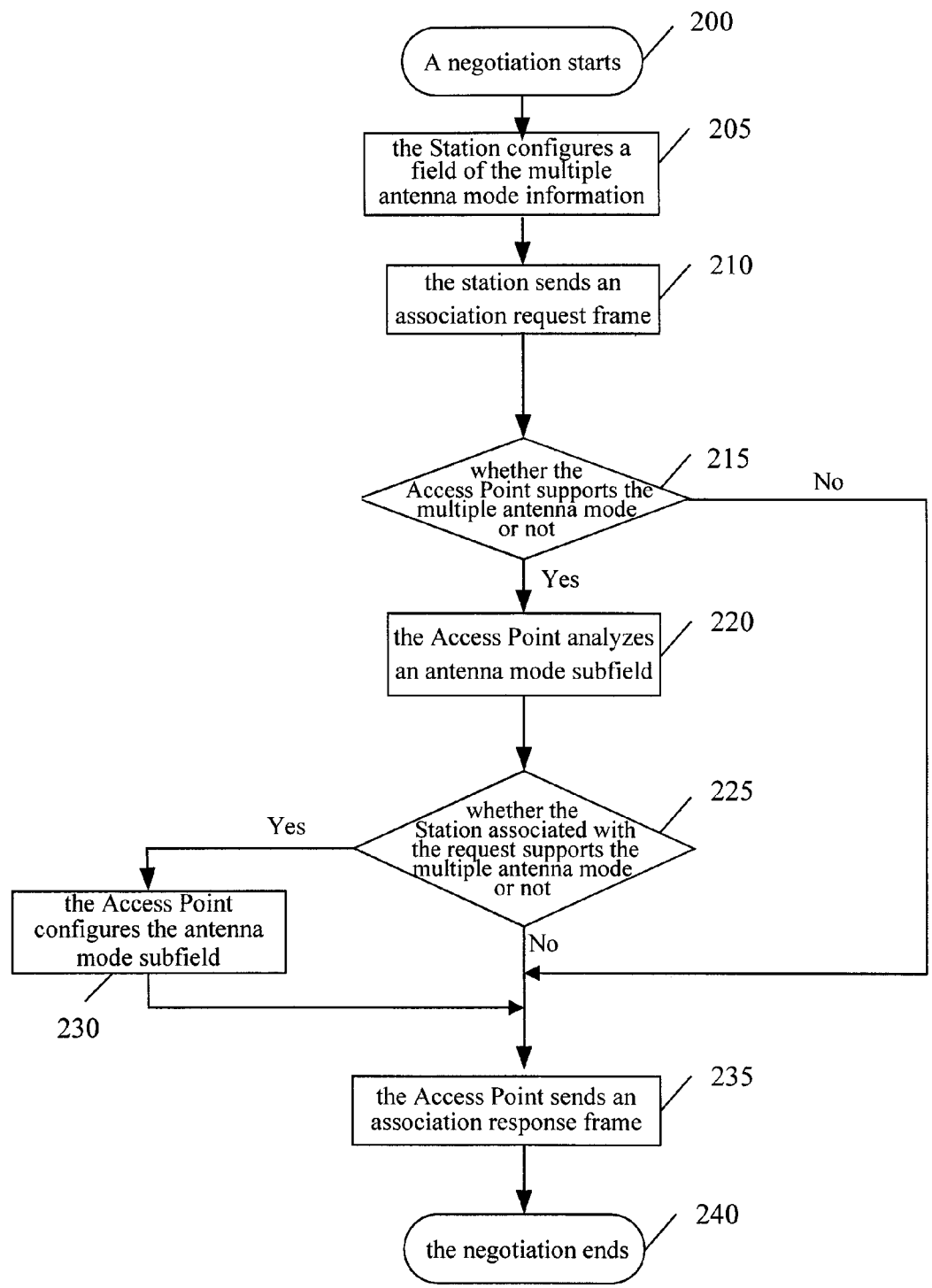
FIG. 2A-FIG. 2C is a detailed flow chart showing the multiple antenna control method in Wireless Local Area Network of one of the invention's embodiments.
Figure 2B:
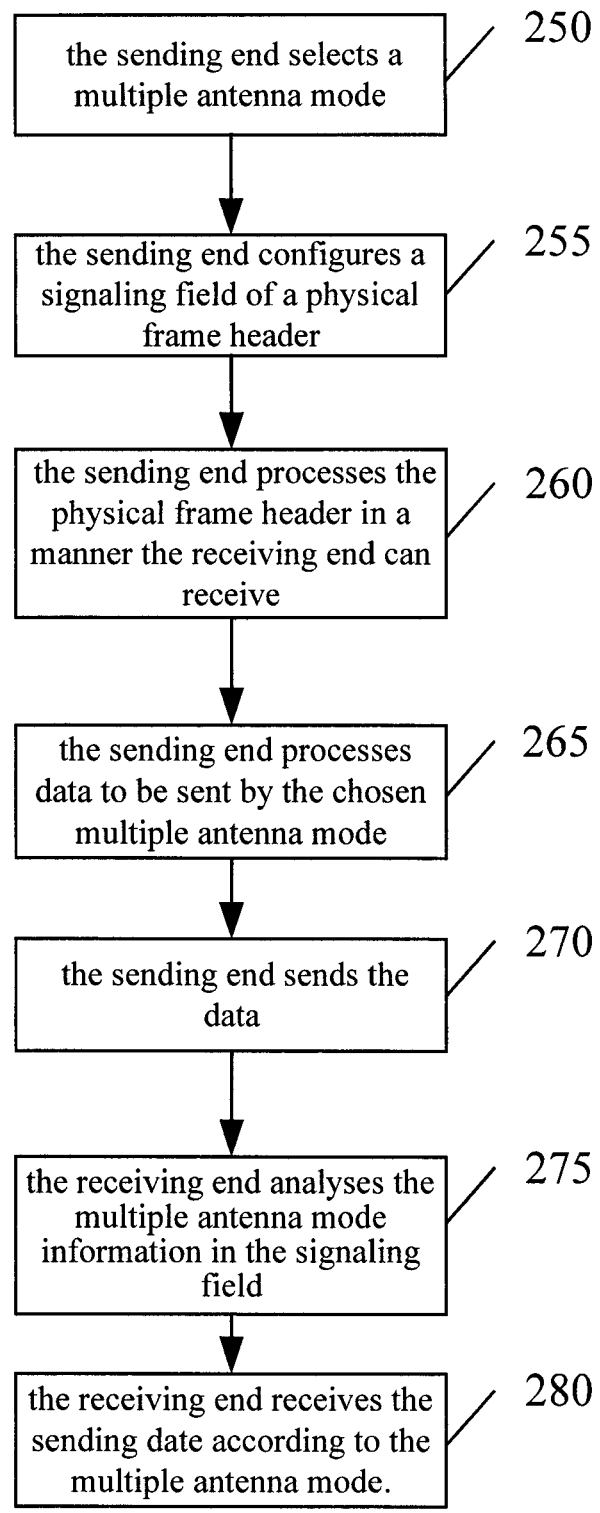
Figure 2C:
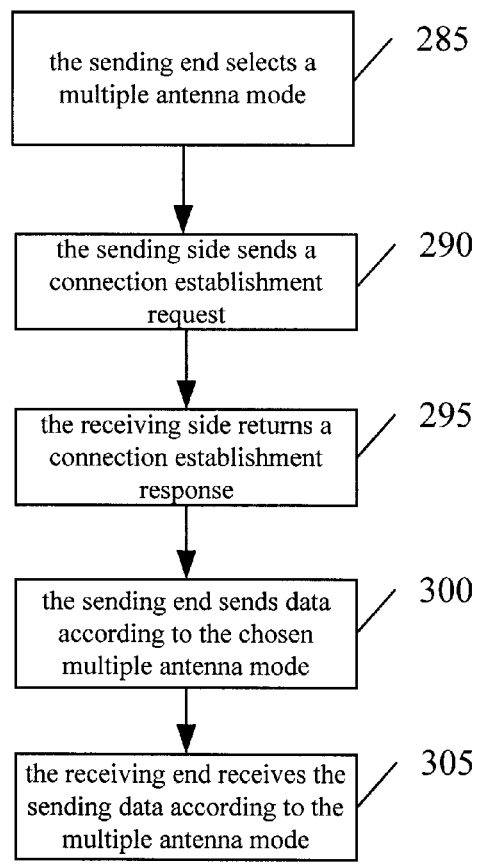
Figure 3A:
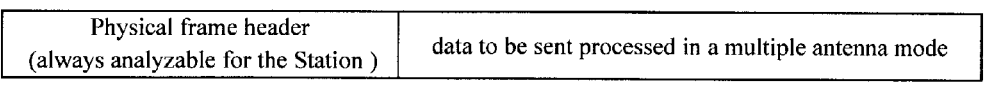
FIG. 3A-FIG. 3B shows the format of a physical frame of a return frame in one of the invention's embodiments.
Figure 3B:
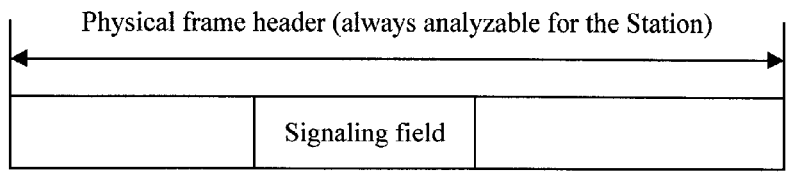

FIG. 2A-FIG. 2C is a detailed flow chart showing the multiple antenna control method in Wireless Local Area Network of one of the invention's embodiments. FIG. 3A-FIG. 3B shows the format of a physical frame of a return frame in one of the invention's embodiments. Now with reference to the above drawings, a description of the preferred embodiments is to be given below.

As shown in FIG. 2, the flow comprises:

S200, when the Station gets authenticated, a multiple antenna mode negotiation starts;

S205, the Station configures the multiple antenna mode information in an association request frame;

In the embodiment, there are all together NA multiple antenna modes, respectively M0~MNA, wherein M0 means that the multiple antenna mode is not used or supported. In the present embodiment, NA bits being taken to indicate an antenna mode subfield. If the i ($0 \leqq i \leqq NA$) bit is "1", it indicates that the Station supports the Mi type multiple antenna mode. For example, if the 2nd and the 7th bits of the subfield are "1", with other bits being "0", it indicates that the Station supports M2 and M7 multiple antenna modes; if bits of the subfield are all "0", it indicates that the Station does not support the multiple antenna mode, or the Station supports the multiple antenna mode but refuses to employ it. It may be specified more exactly in other bits of the capacity information whether the Station supports or employs the multiple antenna mode.

S210, the Station sends the association request frame in a format that the Access Point is able to receive, wherein the association request frame carries the antenna mode subfield.

S215, it is judged whether the Access Point supports the multiple antenna mode or not; if the Access Point supports multiple antenna mode, turn to S220, otherwise configure the antenna mode subfield to be "0", and turn to S235;

S220, the Access Point analyzes the antenna mode subfield in the association request frame, and thereby acquires the multiple antenna mode set or subset supported by the Station;

S225, it is judged whether the Station associated with the request supports or employs the multiple antenna mode or not according to the multiple antenna mode information. If the Station employs the multiple antenna mode, turn to S230; otherwise, configure the antenna mode subfield to be "0", and turn to S235;

S230, the Access Point configures an antenna mode subfield of an association response frame according to the multiple antenna mode set or subset supported by the Access Point; or according to the multiple antenna mode set or subset supported by the Station acquired by the Access Point in S220, the Access Point configures the antenna mode subfield of the association response frame with the multiple antenna mode set or subset supported by both the Station and the Access Point, in combination with the multiple antenna mode set or subset supported by the Access Point;

S235, the Access Point sends the association response frame in a format that the Station is able to receive, wherein the association response frame carries the antenna mode subfield configured by the Access Point;

S240, the Station receives the association response frame. If the Station and the Access Point both employ the multiple antenna mode, the Station will acquire the multiple antenna mode set or subset supported by both the Station and the Access Point therefrom; otherwise, the Station reckons that the Station and the Access Point communicate with each other in a non-multiple antenna mode, and the multiple antenna mode negotiation ends.

In the above S240, the sending and receiving ends start a communication based on the multiple antenna mode. There are two alternative methods for communication based on the multiple antenna mode. The first is to be fulfilled by S250~S280, as illustrated in FIG. 2B, and the second is to be fulfilled by S285~S305, as illustrated in FIG. 2C;

The flow of the communication based on the first method includes the following steps:

S250, when there are data to be sent at a sending end, the sending end selects a multiple antenna mode from the multiple antenna mode set or subset supported by both the Station and the Access Point, and the selection method hereof is based on either or both of the two elements—the channel quality and the demand on QoS of transmitting data;

S255, the sending end configures a signaling field of a physical frame header, and reads the chosen multiple antenna mode information into the signaling field of the physical frame header, as shown FIG. 3B;

S260, the sending end processes the physical frame header in a manner the receiving end can receive. For example, according to a previous agreement, error-correcting coding is conducted to all physical frame headers in ½ convolution code, and then BPSK (Binary Phase Shift Key) modulation is conducted thereto;

S265, the sending end processes the data to be sent in the chosen multiple antenna mode. For example, the chosen multiple antenna mode is 2×2 Space-Time Block Coding, 64QAM Modulating and ¾ Convolution Coding;

S270, the sending end combines the physical frame header obtained in S260 with the processed data to be sent obtained in S265 together in a format shown in FIG. 3A, and then sends them to the receiving end;

S275, the receiving end receives the data, finds the signaling field of the physical frame header and analyze the multiple antenna mode information according to the format shown in FIG. 3B; and S280, the receiving end analyzes the transmission (receiving/sending) data in a corresponding algorithm, according to the acquired multiple antenna mode information.

The flow of the communication based on the second method includes the following steps:

S285, the sending end selects a multiple antenna mode;

More exactly, when a sending end has data to be sent, the sending end can select a multiple antenna mode from the multiple antenna mode set or subset supported by both the Station and the Access Point, and takes the mode as the multiple antenna mode information. The method for selecting a multiple antenna mode is based on either or both of the two elements of the channel quality and the demand on QoS of transmitting data; or the sending end takes either or both of the two pieces of information, the channel quality and the QoS standard of transmitting data, as the multiple antenna mode information;

S290, the sending end sends a connection establishment request frame to the receiving end, wherein the frame carries the multiple antenna mode information;

S295, the receiving end returns a connection establishment response;

More exactly, after receiving the connection establishment request frame, the receiving end analyzes the multiple antenna mode information and determines a multiple antenna mode according to the information, by directly employing the multiple antenna mode specified in the multiple antenna mode information by the sending end, or by choosing a more suitable multiple antenna mode from the multiple antenna mode set or subset supported by both the sending and receiving ends. Moreover, a more suitable multiple antenna mode can also be decided according to channel quality and QoS standard of transmission data. Then, the decided multiple antenna mode is taken as the multiple antenna mode information, which is then written in the connection establishment response frame and returned to the receiving end;

S300, the sending end sends data according to the multiple antenna mode information in the connection establishment response frame; and S305, the receiving side receives the data according to the connected multiple antenna mode corresponding to the receiving data.

To sum up, initiated by the Station, the present invention establishes a multiple antenna capacity negotiation process between the Station and the Access Point, to construct a communication mode supported by different communication systems in a specified multiple antenna mode. Meanwhile, during the subsequent service transmission after the completion of negotiation, the Station and the Access Point can communicate in a reliable or high-speed multiple antenna mode supported by both the sending and receiving ends. Thereby, the error frame rate is reduced, and the network throughput is improved. Therefore, the present invention is applicable to high-speed wireless communication systems.

Described above are only preferred embodiments of the present invention and shall not be construed as limitation the invention. It shall be understood by those skilled in the art that various alterations and changes may be made within the spirit and scope of the invention. All modifications, substitute, equivalents or improvement made therein is intended to be embraced in the claims of this invention.

What is claimed is:

1. A multiple antenna mode control method based on Station, applicable to communication systems comprising an Access Point and a Station, comprising:

Step 1, the Station reporting a multiple antenna mode set or subset supported by the Station to the Access Point;

Step 2, the Access Point returning a multiple antenna mode set or subset supported by the Access Point to the Station, or returning directly a multiple antenna mode set or subset supported by both the Station and the Access Point to the Station; and Step 3, choosing a multiple antenna mode from a multiple antenna mode set or subset supported by both the Station and the Access Point for communicating between the Station and the Access Point;

wherein each of the multiple antenna mode set or subset supported by the Access Point, the multiple antenna mode set or subset supported by the Station, and the multiple antenna mode set or subset supported by both the Station and the Access Point comprises a plurality of multiple antenna modes selected from the group consisting of spatial multiplexing, spatial diversity and beam forming.

2. The multiple antenna mode control method based on Station according to claim 1, wherein Step 1 comprises:

the Station transmits a frame carrying information about the multiple antenna mode set or subset supported by the Station to the Access Point in a manner that the Access Point can analyze.

3. The multiple antenna mode control method based on Station according to claim 2, wherein the multiple antenna mode set includes multiple antenna mode set comprising all transmitting antenna modes and receiving antenna modes supported by the Station and the Access Point agreed in advance according to communication protocol, wherein, each multiple antenna mode is determined according to the number of antennas of both sending and receiving ends as well as a corresponding algorithm.

4. The multiple antenna mode control method based on Station according to claim 2, the multiple antenna mode set supported by the Station refers to all transmitting antenna modes and receiving antenna modes supported by the Station; and the multiple antenna mode subset supported by the Station refers to part of the transmitting antenna modes and receiving antenna modes supported by the Station.

5. The multiple antenna mode control method based on Station according to claim 1, a transmitting antenna mode is not equal to a receiving antenna mode of a same Station.

6. The multiple antenna mode control method based on Station according to any one of claims 1-5, wherein Step 2 comprises:

after receiving the multiple antenna mode set reported by the Station, the Access Point sends a frame to the Station in a manner that the Station can analyze;

wherein, the frame carries the multiple antenna mode set or subset supported by the Access Point, or the multiple antenna mode set or subset supported by both the Station and the Access Point returned directly by the Access Point.

7. The multiple antenna mode control method based on Station according to any one of claims 1-5, wherein, in Step 2 the step of the Access Point returns to the Station the multiple antenna mode set or subset supported by the Access Point comprises:

after receiving the multiple antenna mode set or subset supported by the Station, the Access Point acquires a valid multiple antenna mode set supported by both the Access Point and the Station during their communication; and the Access Point returns the multiple antenna mode set or subset supported by the Access Point to the Station.

8. The multiple antenna mode control method based on Station according to any one of claims 1-5, wherein, in Step 2, the step of the Access Point returns directly to the Station the multiple antenna mode set or subset supported by both the Station and the Access Point comprises:

after receiving the multiple antenna mode set or subset supported by the Station, the Access Point acquires a valid multiple antenna mode set or subset supported by both the Access Point and the Station during their communication; and the Access Point returns to the Station the valid multiple antenna mode set or subset supported by both the Station and the Access Point.

9. The multiple antenna mode control method based on Station according to any one of claims 1-5, wherein, the multiple antenna mode set supported by the Access Point refers to all transmitting antenna modes and receiving antenna modes supported by the Access Point; and the multiple antenna mode subset supported by the Access Point refers to part of the transmitting antenna modes and receiving antenna modes supported by the Access Point.

10. The multiple antenna mode control method based on Station according to claim 1, wherein, a transmitting antenna mode is not equal to a receiving antenna mode of a same Access Point.

11. The multiple antenna mode control method based on Station according to any one of claims 1-5, wherein Step 3 further comprises: with either the Station or the Access Point taken as a sending end, a multiple antenna mode is chosen from the multiple antenna mode set or subset supported by both the Station and the Access Point for broadcasting, multicasting or unicasting.

12. The multiple antenna mode control method based on Station according to claim 11, wherein, in Step 3, the step of choosing a multiple antenna mode from the multiple antenna mode set or subset supported by both the Station and the Access Point comprises:

the sending end selects a multiple antenna mode from the multiple antenna mode set or subset supported by the Station and the Access Point, and sends the mode information to the receiving end in a manner that the receiving end can analyze; and the sending end sends the data to be sent in the multiple antenna mode, and the receiving end receives and analyzes the mode information to receive the data in a corresponding multiple antenna mode.

13. The multiple antenna mode control method based on Station according to claim 11, wherein, in Step 3, the step of choosing a multiple antenna mode from the multiple antenna mode set or subset supported by both the Station and the Access Point comprises:

the sending end and the receiving end agrees in advance a multiple antenna mode of data to be sent, the sending end sends the data to be sent in the multiple antenna mode, while the receiving end receives the data in a corresponding multiple antenna mode;

wherein, the multiple antenna mode is one of the multiple antenna mode set or subset supported by both the Station and the Access Point.

* * * * *